US012329204B2

(12) United States Patent
An

(10) Patent No.: US 12,329,204 B2
(45) Date of Patent: *Jun. 17, 2025

(54) HEATER ASSEMBLY, AEROSOL GENERATING DEVICE, AND AEROSOL GENERATING SYSTEM

(71) Applicant: KT&G CORPORATION, Daejeon (KR)

(72) Inventor: Hwi Kyeong An, Seoul (KR)

(73) Assignee: KT&G CORPORATION, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,965

(22) Filed: Feb. 23, 2024

(65) Prior Publication Data

US 2024/0196980 A1 Jun. 20, 2024

Related U.S. Application Data

(63) Continuation of application No. 17/285,359, filed as application No. PCT/KR2020/016592 on Nov. 23, 2020, now Pat. No. 11,957,176.

(30) Foreign Application Priority Data

Nov. 25, 2019 (KR) ........................ 10-2019-0152706

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *H05B 3/46* (2013.01); *H05B 6/105* (2013.01)

(58) Field of Classification Search
CPC .. A24F 4/00; A24F 4/20; A24F 4/4046; A24F 4/465; H05B 3/40; H05B 3/42; H05B 3/46; H05B 6/10; H05B 6/105
(Continued)

(56) References Cited

U.S. PATENT DOCUMENTS 11,957,176 B2 * 4/2024 An .......................... H05B 3/46
2014/0007891 A1 1/2014 Liu
(Continued)

FOREIGN PATENT DOCUMENTS

CN 207836767 U 9/2018
CN 207968988 U 10/2018
(Continued)

OTHER PUBLICATIONS

Chinese Office Action dated Mar. 31, 2023 in Chinese Application No. 202080007447.5.
(Continued)

*Primary Examiner* — Khiem M Nguyen
(74) *Attorney, Agent, or Firm* — Sughrue Mion, PLLC

(57) ABSTRACT

A heater assembly includes a heating body that generates heat and includes a first portion and a second portion having a diameter smaller than a diameter of the first portion, a first fixing portion that supports the heating body and includes an insertion hole into which the second portion of the heating body is inserted, and a second fixing portion extending in a longitudinal direction of the heating body to form an accommodation space in which a cigarette is accommodated and engaging with the first fixing portion at one side of the second fixing portion, wherein the diameter of the second portion is larger than a diameter of the insertion hole of the first fixing portion before the heating body is inserted into the first fixing portion by interference fit.

14 Claims, 10 Drawing Sheets

(51) Int. Cl.
*H05B 3/46* (2006.01)
*H05B 6/10* (2006.01)

(58) Field of Classification Search
USPC .......................................................... 131/329
See application file for complete search history.

(56) References Cited

U.S. PATENT DOCUMENTS

| | | | |
|---|---|---|---|
| 2016/0044963 A1 | 2/2016 | Saleem | |
| 2017/0055580 A1 | 3/2017 | Blandino et al. | |
| 2019/0230987 A1 | 8/2019 | Wu et al. | |
| 2020/0086068 A1 | 3/2020 | Lee et al. | |
| 2020/0163380 A1 | 5/2020 | Lee et al. | |
| 2020/0187555 A1 | 6/2020 | Lee | |
| 2020/0352231 A1 | 11/2020 | Han et al. | |
| 2020/0359681 A1 | 11/2020 | Han et al. | |
| 2022/0361576 A1* | 11/2022 | An | H05B 3/46 |
| 2024/0196980 A1* | 6/2024 | An | A24F 40/20 |

FOREIGN PATENT DOCUMENTS

| | | | |
|---|---|---|---|
| EP | 3785554 | A1 | 3/2021 |
| JP | 2005-111700 | A | 4/2005 |
| JP | 2019-134701 | A | 8/2019 |
| KR | 10-2015-0119425 | A | 10/2015 |
| KR | 10-2018-0070445 | A | 6/2018 |
| KR | 10-2018-0129676 | A | 12/2018 |
| KR | 10-2019-0027306 | A | 3/2019 |
| WO | 2015/026081 | A1 | 2/2015 |
| WO | 2018/190603 | A1 | 10/2018 |
| WO | 2019/020826 | A1 | 1/2019 |
| WO | 2019/030301 | A1 | 2/2019 |
| WO | 2019/030360 | A1 | 2/2019 |
| WO | 2019/030363 | A1 | 2/2019 |
| WO | 2019/050131 | A1 | 3/2019 |
| WO | 2019/208974 | A1 | 10/2019 |

OTHER PUBLICATIONS

Communication dated Jul. 12, 2022 from the Japanese Patent Office in Application No. 2021-526806.

Communication dated Jul. 15, 2022 from the Canadian Intellectual Property Office in Application No. 3,114,884.

European Office Action dated Jan. 2, 2024 in Application No. 20 873 382.4.

Extended European Search Report dated Dec. 2, 2021 in European Application No. 20873382.4.

International Search Report dated May 21, 2021 from the International Searching Authority in International Application No. PCT/KR2020/016592.

Japanese Office Action dated Jan. 10, 2023 in Japanese Application No. 2021-526806.

Notice of Allowance issued in parent U.S. Appl. No. 17/285,359 mailed Nov. 29, 2023.

* cited by examiner

HEATER ASSEMBLY, AEROSOL GENERATING DEVICE, AND AEROSOL GENERATING SYSTEM

CROSS REFERENCE TO RELATED APPLICATIONS

This application is a continuation of U.S. application Ser. No. 17/285,359 filed Apr. 14, 2021, which is a National Stage of International Application No. PCT/KR2020/016592 filed Nov. 23, 2020, claiming priority based on Korean Patent Application No. 10-2019-0152706 filed Nov. 25, 2019.

TECHNICAL FIELD

The embodiments relate to a heater assembly, an aerosol generating device, and an aerosol generating system, and more particularly, to a heater assembly, an aerosol generating device, and an aerosol generating system which are capable of preventing leakage of an aerosol or leakage of a liquefied aerosol.

BACKGROUND ART

Recently, the demand for an alternative to traditional cigarettes has increased. For example, there is growing demand for an aerosol generating device that generates aerosols by heating an aerosol generating material, rather than by combusting cigarettes. Accordingly, studies on a heating-type cigarette and a heating-type aerosol generating device have been actively conducted.

When an aerosol generating device is used, there may be a problem that an aerosol generated inside the aerosol generating device or a liquefied aerosol leaks between components.

DISCLOSURE

Technical Problem

Embodiments provide a heater assembly, an aerosol generating device, and an aerosol generating system.

The problem to be solved by the embodiments is not limited to the above-described problem, and problems that are not described may be clearly understood by those skilled in the art to which the present disclosure belongs from the present specification and the accompanying drawings.

Technical Solution

A heater assembly according to an embodiment may include a heating body that generates heat and includes a first portion and a second portion having a diameter smaller than a diameter of the first portion, a first fixing portion that supports the heating body and includes an insertion hole into which the second portion of the heating body is inserted, and a second fixing portion extending in a longitudinal direction of the heating body to form an accommodation space in which a cigarette is accommodated and engaging with the first fixing portion at one side of the second fixing portion, wherein the diameter of the second portion in a state before the heating body is inserted into the first fixing portion may be larger than a diameter of the insertion hole of the first fixing portion.

Advantageous Effects

A heater assembly, an aerosol generating device, and an aerosol generating system according to embodiments may prevent formation of a gap through which an aerosol leaks even when deformation occurs between internal components during use. Accordingly, it is possible to prevent an internally generated aerosol from leaking between components, or a liquefied aerosol from leaking.

Effects of the embodiments are not limited to the above-described effects, and effects that are not described will be clearly understood by those skilled in the art to which the present disclosure belongs from the present specification and the accompanying drawings.

BEST MODE

Figure 1A:
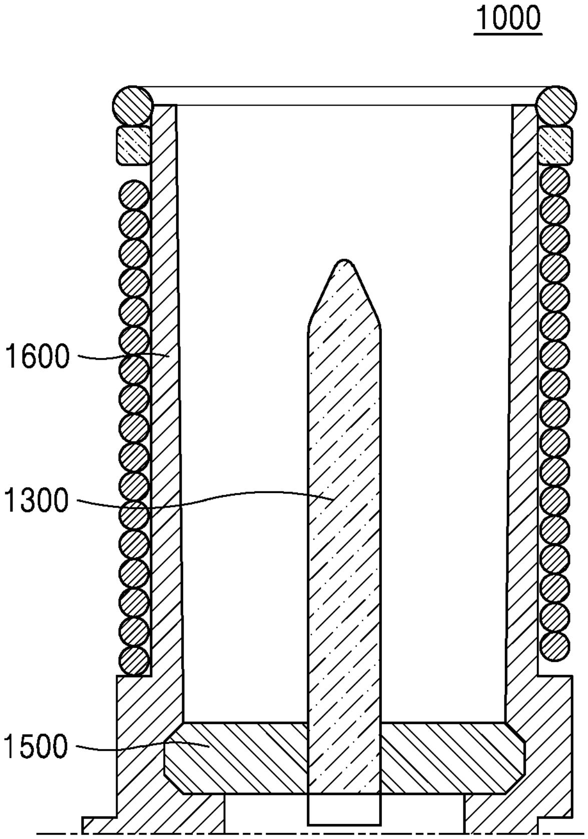
FIG. 1A (PRIOR ART)
FIGS. 1A and 1B are cross-sectional views of a conventional aerosol generating device.

According to an embodiment, a heater assembly may include a heating body that generates heat and includes a first portion and a second portion having a diameter smaller than a diameter of the first portion, a first fixing portion that supports the heating body and includes an insertion hole into which the second portion of the heating body is inserted, and a second fixing portion extending in a longitudinal direction of the heating body to form an accommodation space in which a cigarette is accommodated and engaging with the first fixing portion at one side of the second fixing portion, wherein the diameter of the second portion may be larger than a diameter of the insertion hole of the first fixing portion before the heating body is inserted into the first fixing portion.

In addition, a thermal expansion rate of the first fixing portion may be greater than a thermal expansion rate of the heating body.

In addition, when the heating body is heated, a difference between a length of thermal expansion occurring in the insertion hole of the first fixing portion and a length of thermal expansion occurring in the second portion of the heating body may be smaller than a difference between the diameter of the second portion and the diameter of the insertion hole of the first fixing portion before the heating body is inserted into the first fixing portion.

In addition, the heating body may further include a hook portion formed to extend outward from an end of the second portion when the heating body is inserted into the first fixing portion.

In addition, the second fixing portion may include an extension portion extending in an inward direction to support the first fixing portion.

In addition, the heater assembly may further include a concave portion formed in any one of the extension portion and the first fixing portion, and a convex portion formed in the other of the extension portion and the first fixing portion to engage with the concave portion.

In addition, the heater assembly may further include a protrusion formed in one of the concave portion and the convex portion, and a groove which is formed in the other of the concave portion and the convex portion such that a relative rotation of the first fixing portion with respect to the second fixing portion is prevented by the protrusion received in the groove.

In addition, the second fixing portion may be formed integrally with the first fixing portion by injection molding.

In addition, a surface of the first fixing portion that faces the accommodation space may include a concave portion.

The heater assembly may further include a coil that is arranged outside the second fixing portion to surround at least part of the accommodation space and generates an induced magnetic field, wherein the heating body may further include a susceptor that generates heat due to the induced magnetic field.

In addition, the heater assembly may further include an outer wall arranged around the second fixing portion such that a space is formed between the second fixing portion and the outer wall, and the coil may be arranged in the space formed between the second fixing portion and the outer wall.

An aerosol generating device according to an embodiment may include the heater assembly described above, and a battery that supplies power to the heater assembly, wherein the heater assembly may generate heat with the power supplied from the battery.

An aerosol generating system according to an embodiment may include the aerosol generating device described above, and a cigarette accommodated in the aerosol generating device.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1B:
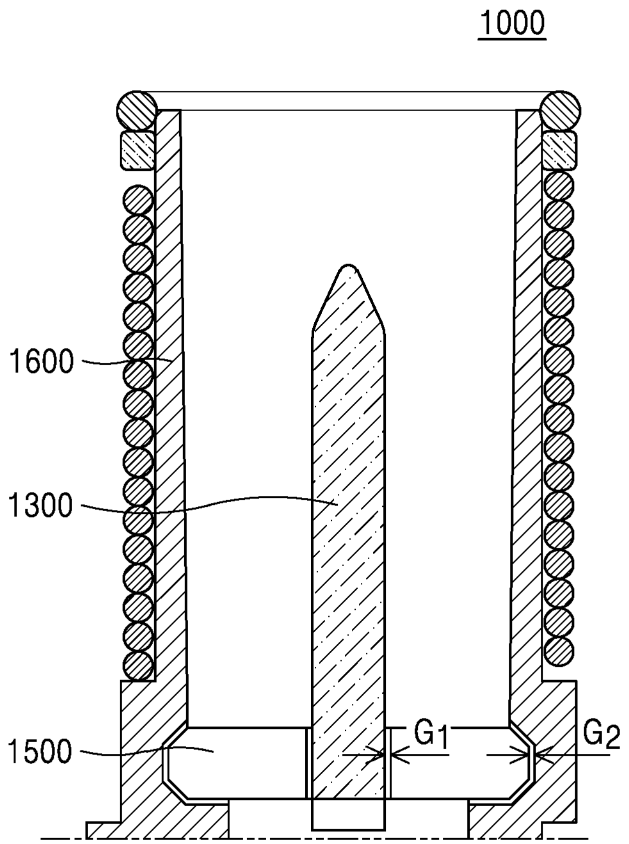
FIG. 1B (PRIOR ART)

FIGS. 1A and 1B are cross-sectional views of a conventional aerosol generating device.

FIG. 1A shows the aerosol generating device before the heating body 1300 is heated. FIG. 1B shows the aerosol generating device 1000 after the heating body 1300 is heated.

Referring to FIG. 1A, the conventional aerosol generating device 1000 includes a heating body 1300, a support body 1500 supporting the heating body 1300, and an inner wall 1600. The temperature of the aerosol generating device 1000 increases according to use of the aerosol generating device 1000, which results in increase of temperature of the heating body 100 and other adjacent members such as the support body 1500 and the inner wall 1600. Here, since coefficients of thermal expansion of the heating body 1300, support body 1500, and inner wall 1600 can be different, a gap can be formed at an area where two components meet.

Referring to FIG. 1B, the difference of a coefficient of thermal expansion between the heating body 1300 and support body 1500 forms a gap G1 between the heating body 1300 and support body 1500, and the difference of a coefficient of thermal expansion between the support body 1500 and inner wall 1600 forms another gap G2 between the support body 1500 and inner wall 1600. While the aerosol generating device 1000 is being used, an aerosol may leak through the gaps G1 and G2. Also, a fluid may leak into the inside of the aerosol generating device 1000 when the aerosol is liquefied.

Figure 2:
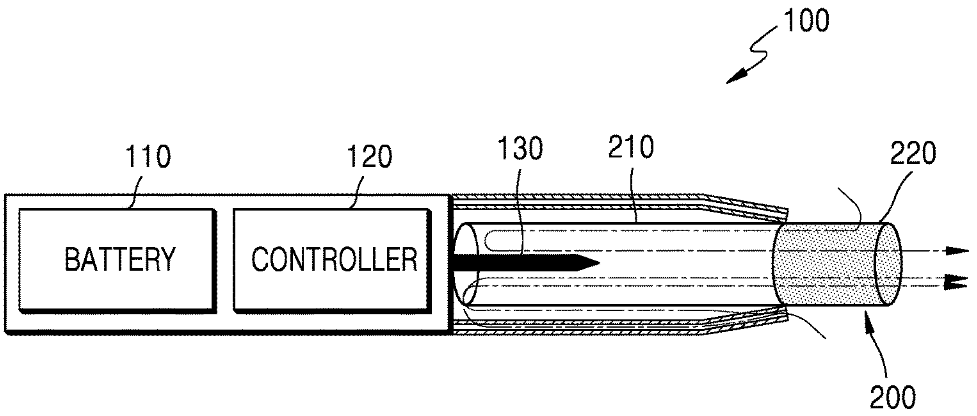
FIGS. 2 to 4 are diagrams showing examples in which a cigarette is inserted into an aerosol generating device.
Figure 3:
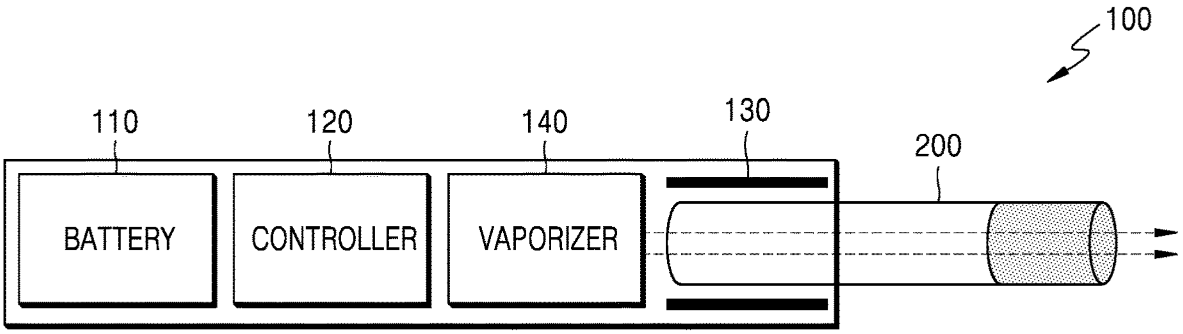
Figure 4:
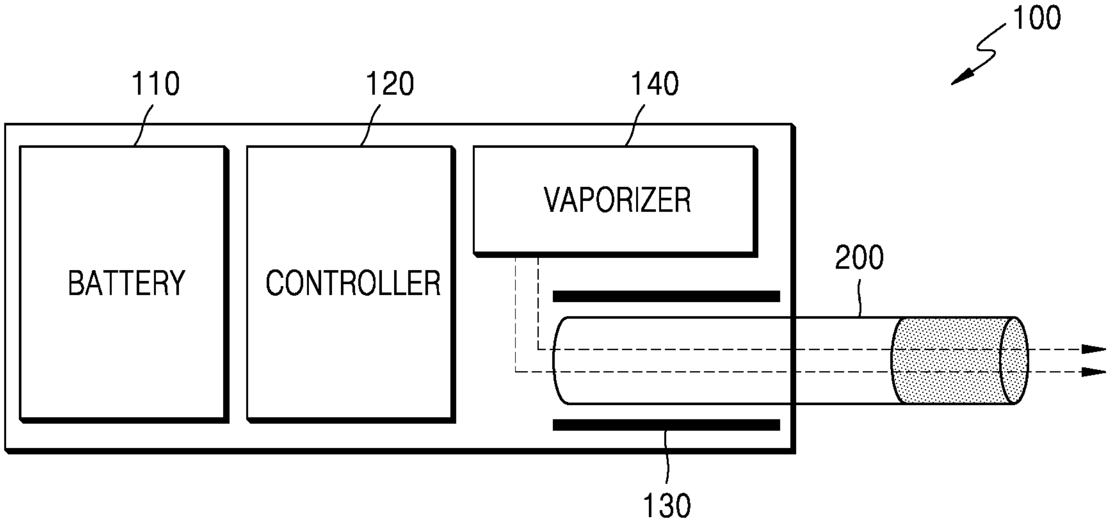

FIGS. 2 to 4 are diagrams showing examples in which a cigarette is inserted into an aerosol generating device.

Referring to FIG. 2, an aerosol generating device 100 includes a battery 110, a controller 120, and a heating body 130. Referring to FIGS. 2 and 3, aerosol generating device 100 further includes a vaporizer 140. Also, a cigarette 200 may be inserted into an inner space of the aerosol generating device 100. The cigarette 200 is an example of an aerosol generating article containing an aerosol generating material, and any other types of aerosol generating articles may be used according to embodiments.

FIGS. 2 to 4 only illustrate some components of the aerosol generating device 100, and it will be understood by one of ordinary skill in the art that other components may be further included in the aerosol generating device 100, in addition to the components illustrated in FIGS. 2 to 4.

Also, FIGS. 3 and 4 illustrate that the aerosol generating device 100 includes the heating body 130. However, according to necessity, the heating body 130 may be omitted.

FIG. 2 illustrates that the battery 110, the controller 120, and the heating body 130 are arranged in series. FIG. 3 illustrates that the battery 110, the controller 120, the vaporizer 140, and the heating body 130 are arranged in series. Also, FIG. 4 illustrates that the vaporizer 140 and the heating body 130 are arranged in parallel. However, the internal structure of the aerosol generating device 100 is not limited to the structures illustrated in FIGS. 2 to 4. In other words, according to the design of the aerosol generating device 100, the battery 110, the controller 120, the vaporizer 140, and the heating body 130 may be differently arranged.

When the cigarette 200 is inserted into the aerosol generating device 100, the aerosol generating device 100 may operate the heating body and/or the vaporizer 140 to generate aerosol from the vaporizer 140. The aerosol generated by the heating body 130 and/or the vaporizer 140 is delivered to the user by passing through the cigarette 200.

In certain circumstances, the aerosol generating device 100 can heat the heating body 130 even when the cigarette is not inserted into the aerosol generating device 100 under special purpose.

The battery 110 may supply power to be used for the aerosol generating device 100 to operate. For example, the battery 110 may supply power to heat the heating body 130 or the vaporizer 140 and may supply power for operating the controller 120. Also, the battery 110 may supply power for operations of a display, a sensor, a motor, etc. mounted in the aerosol generating device 100.

The controller 120 may generally control operations of the aerosol generating device 100. In detail, the controller 120 may control not only operations of the battery 110, the heating body 130, and the vaporizer 140, but also operations of other components included in the aerosol generating device 100. Also, the controller 120 may check a state of each of the components of the aerosol generating device 100 to determine whether or not the aerosol generating device 100 is able to operate.

The controller 120 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heating body 130 may be heated by the power supplied from the battery 110. For example, when the cigarette is inserted into the aerosol generating device 100, the heating body 130 may be located outside the cigarette 200. Thus, the heated heating body 130 may increase a temperature of an aerosol generating material in the cigarette.

The heating body 130 may include an electro-resistive heater. For example, the heating body 130 may include an electrically conductive track, and the heating body 130 may be heated when currents flow through the electrically conductive track. However, the heating body 130 is not limited to the example described above and may include all heaters which may be heated to a desired temperature. Here, the desired temperature may be pre-set in the aerosol generating device 100 or may be set as a temperature desired by a user.

As another example, the heating body 130 may include an induction heater. In detail, the heating body 130 may include an electrically conductive coil for heating a cigarette in an induction heating method, and the cigarette may include a susceptor which may be heated by the induction heater.

For example, the heating body 130 may include a tube-type heating element, a plate-type heating element, a needle-type heating element, or a rod-type heating element, and may heat the inside or the outside of the cigarette 200, according to the shape of the heating element.

Also, the aerosol generating device 100 may include a plurality of heating bodies 130. Here, the plurality of heating bodies 130 may be inserted into the cigarette 200 or may be arranged outside the cigarette 200. Also, some of the plurality of heating bodies 130 may be inserted into the cigarette 200, and the others may be arranged outside the cigarette 200. In addition, the shape of the heating body 130 is not limited to the shapes illustrated in FIGS. 2 to 4 and may include various shapes.

The vaporizer 140 may generate an aerosol by heating a liquid composition and the generated aerosol may pass through the cigarette 200 to be delivered to a user. In other words, the aerosol generated via the vaporizer 140 may move along an air flow passage of the aerosol generating device 100 and the air flow passage may be configured such that the aerosol generated via the vaporizer 140 passes through the cigarette 200 to be delivered to the user.

For example, the vaporizer 140 may include a liquid storage, a liquid delivery element, and a heating element, but it is not limited thereto. For example, the liquid storage, the liquid delivery element, and the heating element may be included in the aerosol generating device 100 as independent modules.

The liquid storage may store a liquid composition. For example, the liquid composition may be a liquid including a tobacco-containing material having a volatile tobacco flavor component, or a liquid including a non-tobacco material. The liquid storage may be formed to be attached/detached to/from the vaporizer 140 or may be formed integrally with the vaporizer 140.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosols may be generated.

For example, the vaporizer 140 may be referred to as a cartomizer or an atomizer, but it is not limited thereto.

The aerosol generating device 100 may further include other components in addition to the battery 110, the controller 120, and the heating body 130. For example, the aerosol generating device 100 may include a display capable of outputting visual information and/or a motor for outputting haptic information. Also, the aerosol generating device 100 may include at least one sensor (e.g., a puff detecting sensor, a temperature detecting sensor, a cigarette insertion detecting sensor, etc.). Also, the aerosol generating device 100 may be configured such that, even when the cigarette 200 is inserted into the aerosol generating device 100, external air may be introduced or internal air may be discharged.

Although not illustrated in FIGS. 2 to 4, the aerosol generating device 100 and an additional cradle may form together a system. For example, the cradle may be used to charge the battery 110 of the aerosol generating device 100. Alternatively, the heating body 130 may be heated when the cradle and the aerosol generating device 100 are coupled to each other.

The cigarette 200 may be similar to a general combustive cigarette. For example, the cigarette 200 may be divided into a first portion including an aerosol generating material and a second portion including a filter, etc. Alternatively, the second portion of the cigarette 200 may also include an aerosol generating material. For example, an aerosol generating material made in the form of granules or capsules may be inserted into the second portion.

The entire first portion may be inserted into the aerosol generating device 100, and the second portion may be exposed to the outside. Alternatively, only a portion of the first portion may be inserted into the aerosol generating device 100, or a portion of the first portion and a portion of the second portion may be inserted thereinto. The user may puff an aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 100. For example, the opening and closing and/or a size of the air passage formed in the aerosol generating device 100 may be adjusted by the user. Accordingly, the amount of smoke and a smoking impression may be adjusted by the user. As another example, the external air may flow into the cigarette 200 through at least one hole formed in a surface of the cigarette 200.

Hereinafter, an example of the cigarette 200 will be described with reference to FIG. 5.

Figure 5:
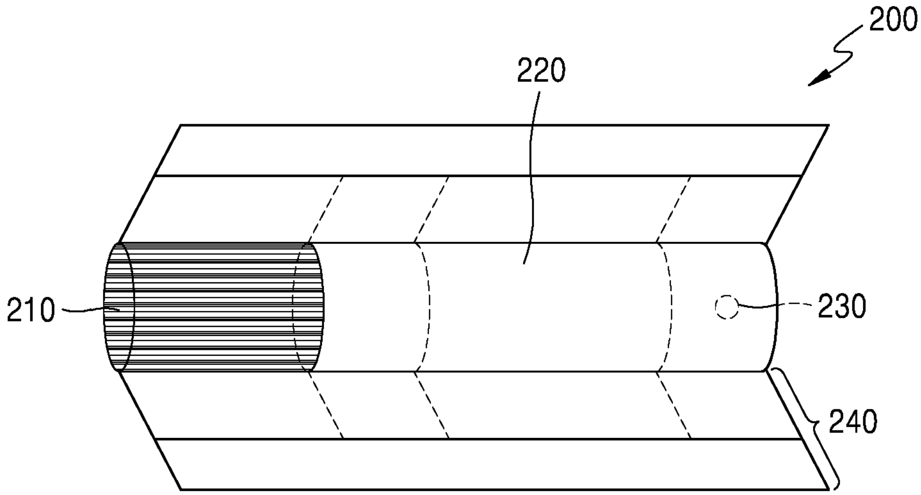
FIG. 5 illustrates a cigarette according to an embodiment.

FIG. 5 is a drawing illustrating an example of a cigarette.

Referring to FIG. 5, the cigarette 200 includes a tobacco rod 210 and a filter rod 220. Referring to FIGS. 2 to 4, the aforementioned first portion includes a tobacco rod 210 and the second portion includes a filter rod 220.

FIG. 5 illustrates that the filter rod 220 includes a single segment. However, the filter rod 220 is not limited thereto. In other words, the filter rod 220 may include a plurality of segments. For example, the filter rod 220 may include a first segment configured to cool an aerosol and a second segment configured to filter a certain component included in the aerosol. Also, according to necessity, the filter rod 220 may further include at least one segment configured to perform other functions.

The cigarette 200 may be packaged by at least one wrapper 240. The wrapper 240 may have at least one hole through which external air may be introduced or internal air may be discharged. For example, the cigarette 200 may be packaged by one wrapper 240. As another example, the cigarette 200 may be double-packaged by at least two wrappers 2400. For example, the tobacco rod 210 may be packaged by a first wrapper, and the filter rod 220 may be packaged by a second wrapper. Also, the tobacco rod 210 and the filter rod 220, which are respectively packaged by separate wrappers, may be coupled to each other, and the entire cigarette 200 may be packaged by a third wrapper. When each of the tobacco rod 210 and the filter rod 220 includes a plurality of segments, each segment may be packaged by a separate wrapper. Also, the entire cigarette 200 including the plurality of segments, which are respectively packaged by the separate wrappers and which are coupled to each other, may be re-packaged by another wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet. Also, the tobacco rod 210 may be surrounded by a heat conductive material. For example, the heat-conducting material may be, but is not limited to, a metal foil such as aluminum foil. For example, the heat conductive material surrounding the tobacco rod 210 may uniformly distribute heat transmitted to the tobacco rod 210, and thus, the heat conductivity applied to the tobacco rod may be increased and taste of the tobacco may be improved. Also, the heat conductive material surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

The filter rod 220 may include a cellulose acetate filter. Shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220.

Also, the filter rod 220 may include at least one capsule 230. Here, the capsule 230 may generate a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. For example, the cooling segment may include pure polylactic acid alone, but the material for forming the cooling segment is not limited thereto.

Although not illustrated in FIG. 5, the cigarette 200 according to an embodiment may further include a front-end filter. The front end plug may be located on one side of the tobacco rod 210 which is opposite to the filter rod 220. The front-end filter may prevent the tobacco rod 210 from being detached outwards and prevent a liquefied aerosol from flowing into the aerosol generating device 100 (FIGS. 2 to 4) from the tobacco rod 210, during smoking.

Figure 6:
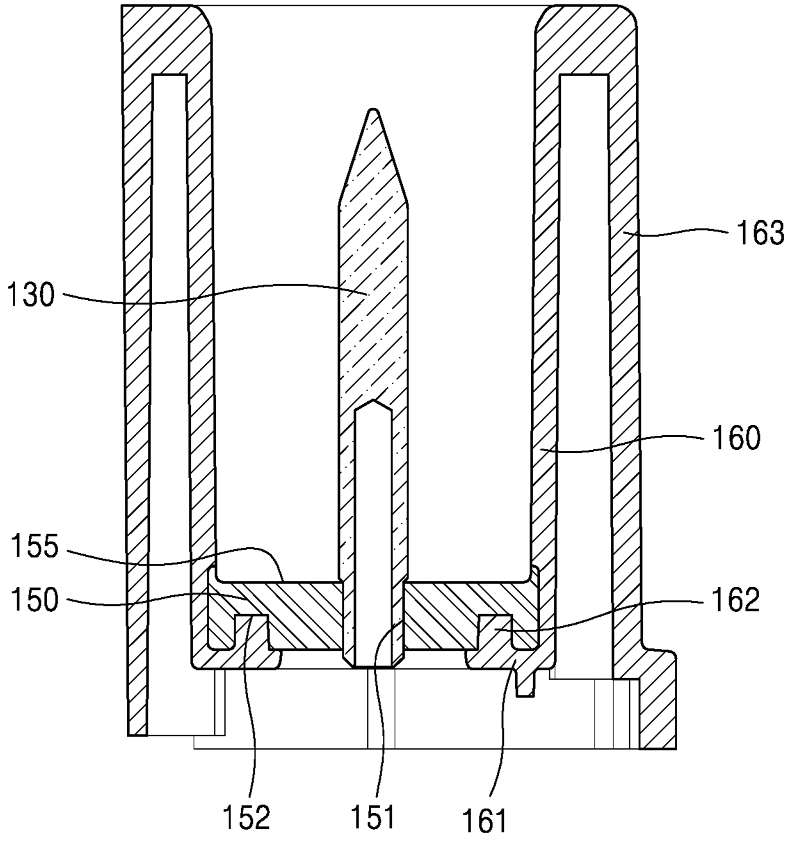
FIG. 6 is a cross-sectional view illustrating part of an aerosol generating device according to an embodiment.

FIG. 6 is a cross-sectional view illustrating part of an aerosol generating device according to an embodiment.

Referring to FIG. 6, the aerosol generating device 100 includes a heating body 130, a first fixing portion 150 supporting the heating body 130, a second fixing portion 160 that extends in a longitudinal direction of the heating body 130 to form an accommodation space in which the cigarette 200 is accommodated and engages with the first fixing portion 150, an outer wall 163.

As described above, the heating body 130 may generate heat by receiving power from the battery 110. The first fixing portion 150 has an insertion hole 151 into which the heating body 130 may be inserted, and the heating body 130 may be assembled to the first fixing portion 150 by being pressed to be inserted into the insertion hole 151 of the first fixing portion 150. Detailed description of the heating body 130, the first fixing portion 150, and an assembly of the heating body 130 and the first fixing portion 150 will be described below.

The second fixing portion 160 may include an extension portion 161 extending in an inward direction (i.e., toward the heating boy 130). An extension portion 161 of the second fixing portion 160 may support the first fixing portion 150. For example, when the aerosol generating device 100 is used, the extension portion 161 of the second fixing portion 160 is located under the first fixing portion 150, thereby supporting the first fixing portion against gravity.

In the embodiment illustrated in FIG. 6, a concave portion 152 is formed on a lower surface of the first fixing portion 150, and a convex portion 162 is formed in the extension portion 161 of the second fixing portion 160. The concave portion 152 of the first fixing portion 150 and the convex portion 162 of the second fixing portion 160 engage with each other, and thereby, a position of the first fixing portion 150 against the second fixing portion 160 may be fixed. Meanwhile, the concave portion 152 and the convex portion 162 are not limited to the embodiment illustrated in FIG. 6. For example, the concave portion may be formed in the second fixing portion 160, and the convex portion engaging with the concave portion formed in the second fixing portion 160 may be formed in the first fixing portion 150.

Meanwhile, when the first fixing portion 150 and the second fixing portion 160 are heated, deformation may occur due to a difference in thermal expansion rate between the first fixing portion 150 and the second fixing portion 160. Due to this deformation, a gap may be formed between the first fixing portion 150 and the second fixing portion 160. According to the embodiment, however, a position of the first fixing portion 150 against the second fixing portion 160 is fixed by the concave portion 152 of the first fixing portion 150 and the convex portion 162 of the second fixing portion 160, and thus, deformation due to thermal expansion may be forcibly prevented. Accordingly, it is possible to prevent a gap that may be formed in the aerosol generating device 1000 of the related art from being formed by a structure in which the concave portion 152 of the first fixing portion 150 and the convex portion 162 of the second fixing portion 160 illustrated in FIG. 6 engage with each other.

In addition, a concave portion 155 is formed on a surface (i.e., an upper surface) of the first fixing portion 150 which faces an accommodation space. When the aerosol generating device 100 is used, an aerosol generated by the cigarette 200 may remain in the accommodation space, and the aerosol may be liquefied as a temperature of the accommodation space decreases. The liquefied aerosol may be collected on the first fixing portion 150. In this case, as the concave portion 155 is formed in the first fixing portion 150, the liquefied aerosol may be collected in the concave portion 155. As such, it is possible to prevent the aerosol from leaking through a gap between other components because the liquefied aerosol may accumulate only in the concave portion 155.

Meanwhile, the second fixing portion 160 may be injection-molded. For example, while the first fixing portion 150 is fixed inside a cavity of a mold, the second fixing portion 160 may be injection-molded to ensure that boundary surfaces of the first fixing portion 150 and the second fixing portion 160 are accurately matched and fixed to each other. Accordingly, the first fixing portion 150 and the second fixing portion 160 may be integrally formed by injection molding. A result of comparing a case in which the second fixing portion 160 is integrally formed with the first fixing portion 150 through the injection molding with a case in which the second fixing portion 160 and the first fixing portion 150 are assembled by an assembly method, is shown in the following table.

TABLE 11

| | Assembly method | Injection molding method |
|---|---|---|
| Mechanical component tolerance | ○ | X |
| Formation of gap between components | ○ | X |
| Formation of gap during thermal expansion | ○ | ○ |
| Necessity of sealing member (elastic member) | Necessary | Unnecessary |
| Heating temperature | Lower | Higher |

When the second fixing portion 160 is integrally formed with the first fixing portion 150 through injection molding, a mechanical tolerance is not necessary between components (that is, the first fixing portion 150 and the second fixing portion 160) as compared with the assembly method, because a gap is not formed between the components (that is, between the first fixing portion 150 and the second fixing portion 160).

However, a gap due to thermal expansion may be formed by both the assembly method and the injection molding method. According to an embodiment, as described above, it is possible to prevent the gap due to thermal expansion from being formed by a structure in which the concave portion 152 of the first fixing portion 150 and the convex portion 162 of the second fixing portion 160 engage with each other. Accordingly, the aerosol generating device 100 illustrated in FIG. 6 does not require a sealing member to seal a gap formed due to thermal expansion and, as a result, may operate at a higher heating temperature. In addition, a process of assembling the sealing member may be omitted in a manufacturing process of the aerosol generating device 100, and thus, the manufacturing process is simplified and manufacturing cost is reduced.

Figure 7A:
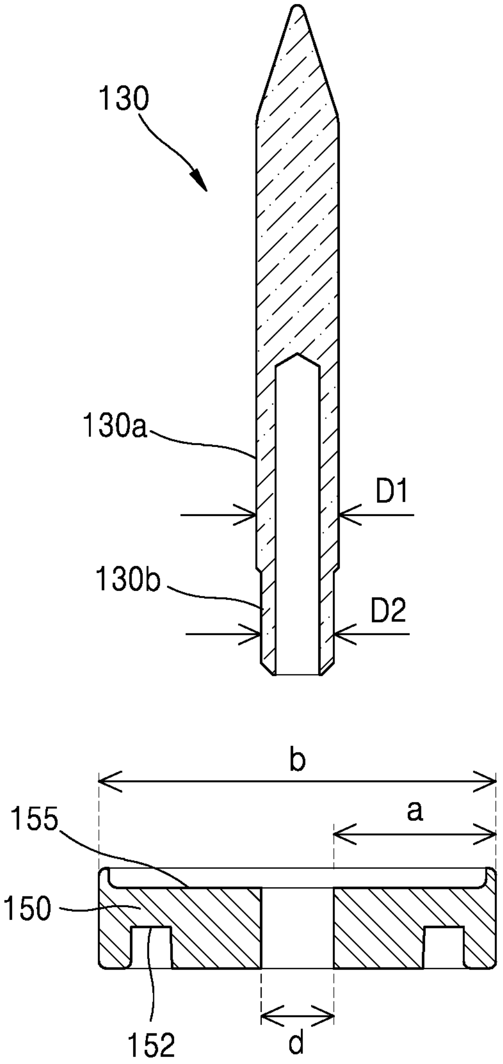
FIGS. 7A to 7C are cross-sectional views illustrating a process of coupling a heating body and a first fixing portion illustrated in FIG. 6.
Figure 7B:
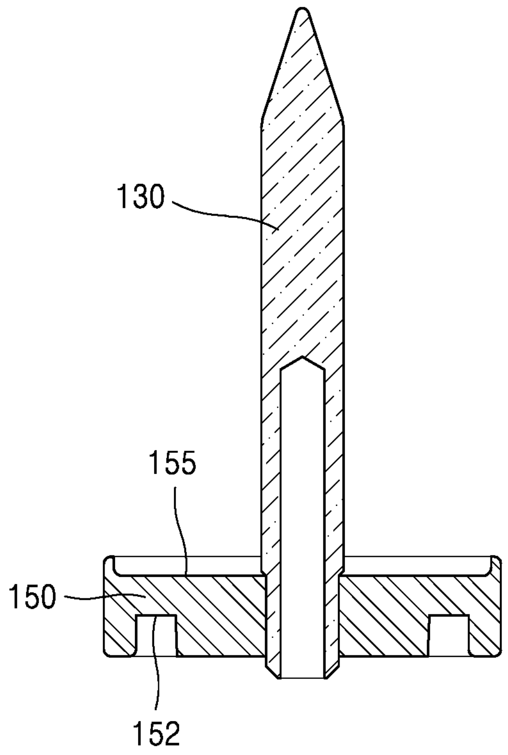
Figure 7C:
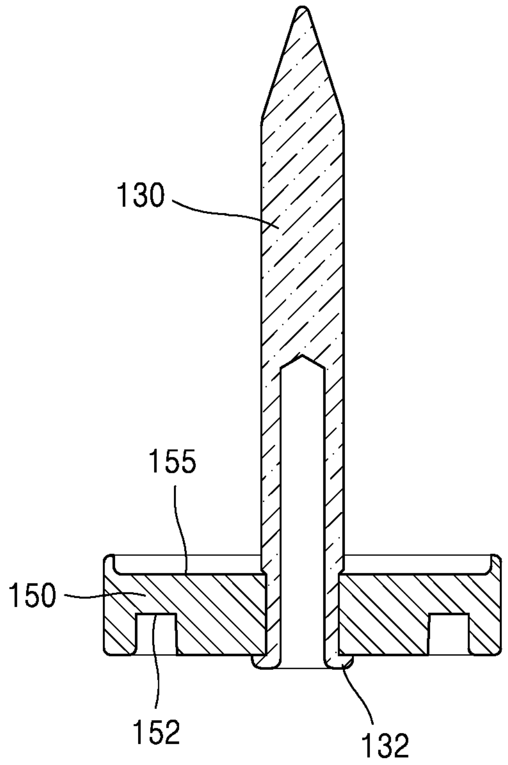

FIGS. 7A to 7C are cross-sectional views illustrating a process in which a heating body and the first fixing portion illustrated in FIG. 6 are coupled to each other.

FIG. 7A illustrates a state before the heating body 130 is inserted into the first fixing portion 150. Referring to FIG. 7A, the heating body 130 may include a first portion 130*a* and a second portion 130*b* having a diameter smaller than a diameter of the first portion 130*a*. A diameter D2 of the second portion 130*b* is smaller than a diameter D1 of the first portion 130*a*, and thus, a step portion is formed between the first portion 130*a* and the second portion 130*b*. In addition, an insertion hole 151 into which the second portion 130*b* of the heating body 130 may be inserted is formed in the first fixing portion 150.

In this case, the heating body 130 and the first fixing portion 150 may include the following configuration to prevent the gap that may be formed in the aerosol generating device 1000 of the related art illustrated in FIG. 1B from being formed.

For example, the diameter D2 of the second portion 130*b* in a state before the heating body 130 is inserted into the first fixing portion 150 may be greater than a diameter d of the insertion hole 151 of the first fixing portion 150. In a case in which a thermal expansion rate of the first fixing portion 150 is different from a thermal expansion rate of the heating body 130, when the heating body 130 and the first fixing portion 150 are heated by using the aerosol generating device 100, the amount of deformation due to thermal expansion in the insertion hole 151 of the fixing portion 150 is different from the amount of deformation due to thermal expansion in the second portion 130*b* of the heating body 130. In particular, when the thermal expansion rate of the first fixing portion 150 is greater than the thermal expansion rate of the heating body 130, the amount of deformation in the insertion hole 151 may be greater than the amount of deformation in the second portion 130*b*. In this case, as the diameter D2 of the second portion 130*b* is formed larger than the diameter d of the insertion hole 151, a difference between the amounts of deformation due to thermal expansions may be offset. Accordingly, by adjusting the diameter D2 of the second portion 130*b* and the diameter d of the insertion hole 151, a gap between the heating body 130 and the first fixing portion 150 may be effectively prevented from being formed.

In addition, a difference between a length of thermal expansion occurring in the insertion hole 151 of the first fixing portion 150 and a length of thermal expansion occurring in the second portion 130*b* of the heating body 130 may be less than a difference between the diameter D2 of the second portion 130*b* and the diameter d of the insertion hole 151 of the first fixing portion 150 in a state before the heating body 130 is inserted into the first fixing portion 150.

In this case, the length of deformation of the diameter D2 due to thermal expansion occurring in the second portion 130*b* of the heating body 130 is calculated by Equation 1 shown below.

$$\Delta D2 = D2 \times \alpha_{heating\ body} \times \Delta T_{heating\ body} \quad \text{[Equation 1]}$$

In Equation 1, ΔD2 is a deformation length of D2, $\alpha_{heating\ body}$ is a linear expansion coefficient for a diameter of a heating body 130, and $\Delta T_{heating\ body}$ is the amount of temperature change in the heating body 130.

In addition, a deformation length of the diameter d due to thermal expansion occurring in the insertion hole 151 of the first fixing portion 150 is calculated by Equation 2 shown below.

$$\Delta a = a \times \alpha_a \times \Delta T_{first\ fixing\ portion}, \quad \text{[Equation 2]}$$
$$\Delta b = b \times \alpha_b \times \Delta T_{first\ fixing\ portion},$$
$$\Delta d = \Delta b - 2 \times \Delta a$$

Here, 'Δa' is a deformation length of 'a' illustrated in FIG. 7A, 'Δb' is a deformation length of 'b' illustrated in FIG. 7A, 'Δd' is a deformation length for 'd', '$\alpha_a$' and '$\alpha_b$' are respectively linear expansion coefficients for 'a' and 'b' of the first fixing portion 150, and '$\Delta T_{first\ fixing\ portion}$' is the amount of temperature change in the first fixing portion 150.

Accordingly, a diameter of the second portion 130*b* in a state before the heating body 130 is inserted into the first fixing portion 150 may be determined based on values of 'ΔD2' and 'Δd' calculated by Equations 1 and Equation 2 described above.

FIG. 7B illustrates a state in which the heating body 130 is inserted into the first fixing portion 150. As described above, before the heating body 130 is inserted into the first fixing portion 150, the diameter D2 of the second portion 130*b* is larger than the diameter d of the insertion hole 151. Thus, the heating body 130 may be forcibly inserted into the first fixing portion 150 by interference fit. Accordingly, the heating body 130 may be made of a metal material, and the first fixing portion 150 may be made of a plastic material having elasticity so that the heating body 130 having a diameter larger than the diameter of the insertion hole 151 may be inserted. However, materials of the heating body 130 and the first fixing portion 150 are not limited to the materials described above.

In addition, when the heating body 130 is inserted into the first fixing portion 150, movement of the heating body 130 toward an insertion direction may be limited due to a step portion formed between the first portion 130*a* and the second portion 130*b*.

FIG. 7C illustrates a state after the heating body 130 is inserted into the first fixing portion 150 and fixed thereto. Referring to FIG. 7C, the heating body 130 may further include a hook portion 132 formed to extend outward from an end of the second portion 130*b*. The hook portion 132 may limit movement of the heating body 130 in a direction opposite to an insertion direction. Accordingly, the heating body 130 may be stably fixed to the first fixing portion 150 by a step portion formed between the first portion 130*a* and the second portion 130*b* and by the hook portion 132 caught by the first fixing portion 150. In this case, the hook portion 132 may be formed by deforming an end of the second portion 130*b* outward. However, it is not limited thereto. For example, the hook portion 132 may also be formed by attaching a separate member to the end of the second portion 130*b*.

Figure 8:
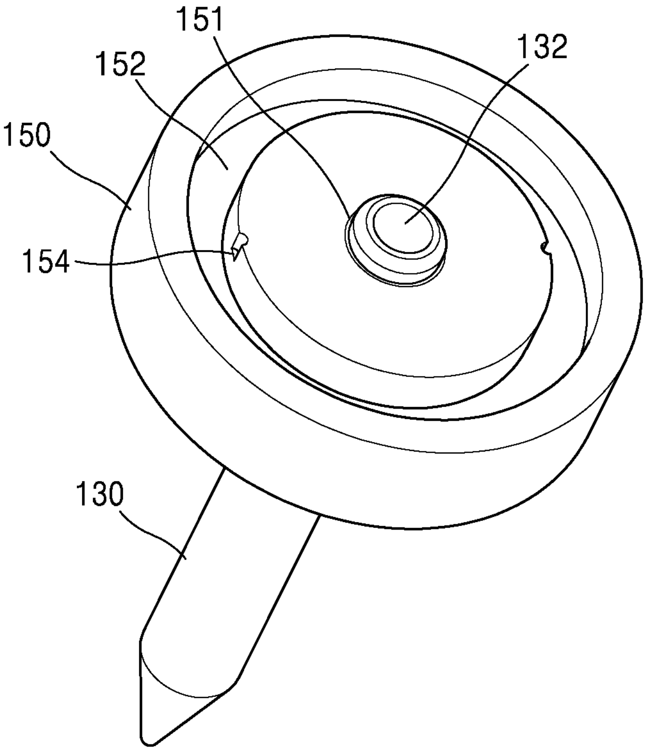
FIG. 8 is a perspective view illustrating a lower surface of an assembly of the heating body and the first fixing portion illustrated in FIG. 7.

FIG. 8 is a perspective view illustrating a lower surface of an assembly of the heating body and the first fixing portion illustrated in FIGS. 7A to 7C.

Referring to FIG. 8, the concave portion 152 is formed in a lower surface of the first fixing portion 150. In the embodiment illustrated in FIG. 8, the concave portion 152 has an annular shape. However, the concave portion 152 may have any shape without being limited thereto, as long as it can engage with the convex portion 162 of the second fixing portion 160. For example, the concave portion 152 may have a polygonal shape.

In addition, a groove 154 may be formed in the concave portion 152 of the first fixing portion 150, and the convex portion 162 of the second fixing portion 160 may have a protrusion (not illustrated) such that it is received in the groove 154. The protrusion of the second fixing portion 160 is received in the groove 154 of the first fixing portion 150 to prevent a relative rotation of the first fixing portion 150 and the second fixing portion 160. Meanwhile, structures of the groove 154 and the protrusion received in the groove 154 are not limited to the embodiment illustrated in FIG. 8. For example, a groove may be formed in the convex portion 162 of the second fixing portion 160, and a protrusion to be received in the groove formed in the convex portion 162 may be formed in the concave portion 152 of the first fixing portion 150.

Figure 9:
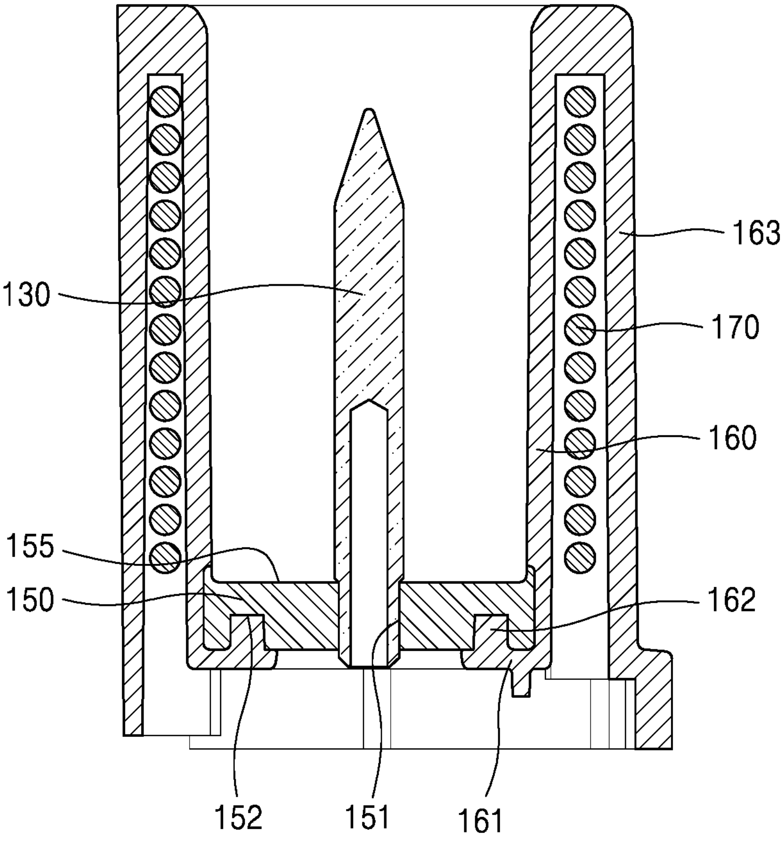
FIG. 9 is a cross-sectional view illustrating part of an aerosol generating device according to another embodiment.

FIG. 9 is a cross-sectional view illustrating part of an aerosol generating device according to another embodiment. Hereinafter, detailed description overlapping with the above description will be omitted.

Referring to FIG. 9, an aerosol generating device 100 may generate an aerosol by heating a cigarette 200 accommodated in the device 100 by an induction heating method. The induction heating method may refer to a method of applying an alternating magnetic field that periodically changes a direction to a magnetic body such that the magnetic body generates heat due to an external magnetic field.

For example, the aerosol generating device 100 may include a coil 170 that is arranged outside the second fixing portion 160 to surround at least part of an accommodation space and generates an induced magnetic field, and the heating body 130 may include a susceptor that generates heat due to the induced magnetic field.

When an alternating magnetic field is applied to a magnetic body, energy loss due to eddy current loss and hysteresis loss may occur in the magnetic body, and the lost energy may be released from the magnetic body as thermal energy. As an amplitude or a frequency of the alternating magnetic field applied to the magnetic body increases, more heat energy may be released from the magnetic body. The aerosol generating device 100 may release thermal energy from a magnetic body by applying an alternating magnetic field to the magnetic material and may transmit the thermal energy released from the magnetic body to a cigarette.

A magnetic body that generates heat due to an external magnetic field may be a susceptor. The susceptor may be arranged in the aerosol generating device 100 or may be included in the cigarette in a shape of a piece, flake or strip. For example, as described above, the susceptor may be included in the heating body 130 arranged inside the aerosol generating device 100.

According to embodiments, the susceptor may include metal or carbon. The susceptor may include at least one of ferrite, ferromagnetic alloy, stainless steel, and aluminum (Al). In addition, the susceptor may include at least one of a ceramic such as graphite, molybdenum, silicon carbide, niobium, nickel alloy, metal film, or zirconia, a transition metal such as nickel (Ni) or cobalt (Co), and a metalloid such as boron (B) or phosphorus (P).

In a case where the susceptor is provided in the aerosol generating device 100 rather than an inside of a cigarette, there may be various advantages. For example, a problem that an aerosol and flavor are generated non-uniformly when a susceptor material is not uniformly distributed inside the cigarette can be solved. In addition, the heating body 130 including a susceptor is provided in the aerosol generating device 100, and thus, a temperature of the heating body 130 that generates heat by induction heating may be directly measured and provided to the aerosol generating device 100. Accordingly, the temperature of the heating body 130 may be precisely controlled.

In the embodiment illustrated in FIG. 9, an outer wall 163 may be formed to be spaced apart from the second fixing portion 160 outward. The second fixing portion 160 is connected to the outer wall 163 such that a space is formed between the second fixing portion 160 and the outer wall 163. The coil 170 may be arranged in a space between the second fixing portion 160 and the outer wall 163. That is, the coil 170 may be wound around an accommodation space and arranged at a position corresponding to the heating body 130.

The coil 170 may receive power from the battery 110. The controller 120 of the aerosol generating device 100 may generate a magnetic field by controlling an electrical current flowing through the coil 170, and an induced electrical current may be generated in the heating body 130 due to an influence of the magnetic field. Such an induction heating phenomenon is well known and may be explained by Faraday's Law of induction and Ohm's Law. Specifically, an electric field is generated in a conductor when magnetic induction changes in the conductor.

As such, as an electric field is generated in a conductor, an eddy current flows in the conductor according to Ohm's law, and the eddy current generates heat proportional to current density and conductor resistance.

In other words, when power is supplied to the coil 170, a magnetic field may be generated inside the coil 170. When an alternating current is applied to the coil 170 from the battery 110, the magnetic field formed inside the coil 170 may change its direction periodically. When the heating body 130 is formed inside the coil 170 and exposed to an alternating magnetic field that periodically changes its direction, the heating body 130 generates heat to heat a cigarette accommodated in the aerosol generating device 100.

When the alternating magnetic field formed by the coil 170 changes the amplitude or frequency, the heating body 130 that heats a cigarette may also change the temperature. The controller 120 may control the power supplied to the coil 170 to adjust the amplitude or the frequency of the alternating magnetic field formed by the coil 170, and thus, the temperature of the heating body 130 may be controlled.

For example, the coil 170 may be implemented as a solenoid. A material of a wire used for the solenoid may be copper (Cu). However, the material is not limited thereto, and any material with a low resistance value that allows a high current to flow, such as silver (Ag), gold (Au), aluminum (Al), tungsten (W), zinc (Zn), and nickel (Ni), or an alloy containing at least one of the materials may be used as a material of a wire used for a solenoid.

At least one of the components, elements, modules or units (collectively "components" in this paragraph) represented by a block in the drawings such as the controller 120 in FIGS. 2-3, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

INDUSTRIAL APPLICABILITY

The embodiments relate to a heater assembly, an aerosol generating device, and an aerosol generating system which are capable of preventing an aerosol from leaking or a liquefied aerosol from leaking.

The invention claimed is:

1. A heater assembly comprising:

a heating body configured to generate heat, and including a first portion and a second portion having a diameter smaller than a diameter of the first portion;

a first fixing portion that supports the heating body and includes an insertion hole into which the second portion of the heating body is inserted; and wherein the diameter of the second portion is larger than a diameter of the insertion hole of the first fixing portion before the heating body is inserted into the first fixing portion.

2. The heater assembly of claim 1, wherein a thermal expansion rate of the first fixing portion is greater than a thermal expansion rate of the heating body.

3. The heater assembly of claim 2, wherein, when the heating body is heated, a difference between a length of thermal expansion occurring in the insertion hole of the first fixing portion and a length of thermal expansion occurring in the second portion of the heating body is smaller than a difference between the diameter of the second portion and the diameter of the insertion hole of the first fixing portion before the heating body is inserted into the first fixing portion.

4. The heater assembly of claim 1, wherein the heating body further comprises a hook portion formed to extend outward from an end of the second portion when the heating body is inserted into the first fixing portion.

5. The heater assembly of claim 1, further comprising:

a second fixing portion extending in a longitudinal direction of the heating body to form an accommodation space in which a cigarette is accommodated, and engaging with the first fixing portion at one side of the second fixing portion.

6. The heater assembly of claim 5, wherein the second fixing portion includes an extension portion extending in an inward direction to support the first fixing portion.

7. The heater assembly of claim 6, further comprising:

a concave portion formed in one of the extension portion and the first fixing portion; and a convex portion formed in the other of the extension portion and the first fixing portion to engage with the concave portion.

8. The heater assembly of claim 7, further comprising:

a protrusion formed in one of the concave portion and the convex portion; and a groove which is formed in the other of the concave portion and the convex portion such that a relative rotation of the first fixing portion with respect to the second fixing portion is prevented by the protrusion received in the groove.

9. The heater assembly of claim 7, wherein the second fixing portion is formed integrally with the first fixing portion by injection molding.

10. The heater assembly of claim 5, wherein a surface of the first fixing portion that faces the accommodation space includes a concave portion.

11. The heater assembly of claim 5, further comprising:

a coil arranged outside the second fixing portion to surround at least part of the accommodation space, and configured to generate an induced magnetic field, and wherein the heating body further comprises a susceptor that generates heat in response to the induced magnetic field.

12. The heater assembly of claim 11, further comprising:

an outer wall arranged around the second fixing portion and arranged such that a space is formed between the outer wall and the second fixing portion, and wherein the coil is arranged in the space formed between the second fixing portion and the outer wall.

13. An aerosol generating device comprising:

the heater assembly according to claim 1; and a battery configured to supply power to the heater assembly, wherein the heater assembly generates heat with the power supplied from the battery.

14. An aerosol generating system comprising:

the aerosol generating device of claim 13; and a cigarette accommodated in the aerosol generating device.

* * * * *